United States Patent [19]
Gladwin

[11] Patent Number: 6,082,194
[45] Date of Patent: Jul. 4, 2000

[54] GRAVITY METER

[75] Inventor: Michael Thomas Gladwin, Upper Brookfield, Australia

[73] Assignee: The Commonwealth of Australia Commonwealth Scientific and Industrial Research Organization, Campbell, Australia

[21] Appl. No.: 09/171,859

[22] PCT Filed: Apr. 23, 1997

[86] PCT No.: PCT/AU97/00249

§ 371 Date: Oct. 26, 1998

§ 102(e) Date: Oct. 26, 1998

[87] PCT Pub. No.: WO97/41459

PCT Pub. Date: Nov. 6, 1997

[30] Foreign Application Priority Data

Apr. 26, 1996 [AU] Australia ................................ PN 9510

[51] Int. Cl.⁷ ..................................................... G01V 7/14
[52] U.S. Cl. ............................................................ 73/382 G
[58] Field of Search ............................... 73/382 G, 382 R

[56] References Cited

U.S. PATENT DOCUMENTS

| | | | |
|---|---|---|---|
| 2,217,123 | 10/1940 | Malmqvist | 265/1.4 |
| 3,727,462 | 4/1973 | Stone et al. | 73/382 G |
| 4,419,891 | 12/1983 | Browning | 73/382 G |

FOREIGN PATENT DOCUMENTS

| | | |
|---|---|---|
| 265706 | 3/1989 | Germany . |
| 265707 | 3/1989 | Germany . |
| WO89/05462 | 6/1989 | WIPO . |

OTHER PUBLICATIONS

Derwent Abstract Accession No. 84–305915/49, SU 1086397A (Ryazan Wireless Eng Inst), Apr. 15, 1984.

Derwent Abstract Accession No. C3057 D/11, SU 74416A (As UKR Low Temp Phy), Jun. 30, 1980.

*Primary Examiner*—John E. Chapman
*Attorney, Agent, or Firm*—Jacobson, Price, Holman & Stern, PLLC

[57] ABSTRACT

A gravity gradiometer including first and second proof masses and a device for providing simultaneous free flight of the proof masses under the influence of the gravitational force in which the gradient is to be measured and a capacitance device for monitoring the movement of the centers of mass with respect to each other during free flight by monitoring capacitance between portions of the two proof masses.

24 Claims, 5 Drawing Sheets

GRAVITY METER

The invention relates to an apparatus for measuring gravity gradients and in particular to a gravity gradiometer suitable for use in prospecting.

There are generically only four types of measurements available for use in prospecting for subterranean orebodies. Magnetic field mapping has been extensively used over the past twenty years with great success for ferromagnetic orebodies. Aerial electromagnetic surveys have recently indicated very great potential for identification of conductive orebodies while still more recently the potential of airborne geochemical analysis of surface material by spectral reflectance has been demonstrated. The remaining parameter known to be of significance in surface observations, the gravitational field, has not yet been used with sufficient precision to provide a reliable prospecting method.

The presence of subterranean structures such as orebodies, gas and oil deposits gives rise to minute variations in gravitational field at the earths surface.

The magnitude of a typical anomaly relative to the unperturbed gravity field is proportional to the total mass excess (or deficit), and is inversely proportional to the square of the distance from its effective centre to the point of observation. Most traditional gravity measurements are performed on stationary platforms fixed to the earth surface, and precision is limited by vibration noise sources common in the earth.

The gravitational anomaly of an ore body of density contrast 300 kg m$^{-3}$ and of dimension say 200 m buried below a depth of say 100 m of overburden is typically $2\times10^{-6}$ms$^{-2}$, which is 0.00002% of the normal earth gravity field. This relatively small effect is normally measured in units of micro gals $\mu$Gal, and would represent approximately 200 $\mu$Gal.

To this time most resource significant measurements have been made using instruments of the LaCoste/Roberg type which are essentially ultrasensitive spring balances detecting the small difference in weight caused by the gravity anomaly. The measurements are subject to a wide variety of environmental influences, and measurements must be performed relative to a standard point which is used regularly during the survey as a fixed reference for the removal of drifts in the instrument. With great care, measurements over reasonable areas can be achieved to about 5 $\mu$Gals, making this technology appropriate for mapping regions of known potential. The procedure is slow, and requires extensive information on local topography and geology by reason of the fact that the normal variation of gravity with height is approximately 300 $\mu$Gal per meter.

On mobile platforms, it is not generally possible to distinguish the accelerations acting on a body due to variable gravitational effects from those due to kinematic effects associated with changes of the body's velocity. Aerial prospecting, which is the most economic method of covering large areas, cannot be achieved with adequate precision with instruments normally used for measuring the gravitational field from fixed platforms at the earth's surface.

This suspended mass type of relative gravity instrument has in fact been used with great difficulty from moving platforms and in particular from aircraft where altitude control using for example precision radar altimeters and pressure sensors can be used to achieve vertical position to fractions of a meter. This still imposes limitations of the order of a few hundred $\mu$Gal on the gravity data. For this reason emphasis for large scale geophysical prospecting has moved towards gradiometry. In principle, measurement of the gradient of the gravity field over a known baseline allows one to cancel out the accelerations due to the motion of the platform itself. Gradient measurements also have some advantages in detection of boundaries of anomalies.

The vertical component of the gradient above the orebody discussed above and measured from an aircraft 100 m above the surface is approximately $6\times10^{-9}$ ms$^{-2}$ per meter, which is 6 Eotvos (the Eotvos is a unit of gravity gradient, and 1 Eotvos corresponds to $10^{-9}$s$^{-2}$). The gradient would be 3.5 times larger at the earth's surface.

The intrinsic limitation of all systems presently under development is the fact that measurements are made relative to the transport platform, so that massively complex systems are required to isolate the instruments from mechanical vibrations and to compensate for aircraft motions. Some proposed systems can only be operated at liquid Helium temperatures, imposing further serious restrictions on their usefulness.

Vertically separated masses under free fall conditions exhibit minutely different accelerations resulting in a minute increase in separation. For example, for the orebody referred to above the differential acceleration for a pair of bodies separated by 0.1 m at a height above the earth of 100 m would be of the order of $6\times10^{-10}$ms$^{-2}$. In a free fall environment lasting 0.3 seconds this would lead to a separation of the centers of masses of approximately $3\times10^{-11}$m. This separation of the objects in free fall is not subject to perturbation from dynamic accelerations of the aircraft which occur after the objects are released.

Gravity gradiometer measuring systems involving laser measurements have been suggested however such systems are generally only suitable for conducting measurements from a stationary platform due to the need for precision in laser alignment. Moreover even with stationary platforms laser intereferometry is not precise enough to allow detail of variation in the earths gravity field to be adequately detected. In principle the accuracy of lasers is limited by the wavelength of the light used which is typically a few hundred nanometres.

It is an object of the invention to provide a gravity gradiometer suitable for use on a moving platform and which alleviates or overcomes one or more of the difficulties of the prior art.

Accordingly we provide a gravity gradiometer comprising first and second proof masses and means for providing simultaneous free flight of the proof masses under the influence of the gravitational force in which the gradient is to be measured and capacitance means for monitoring change in the distance between the centers of one of the proof masses during free flight by monitoring capacitance between portions of the two proof masses.

In a preferred embodiment the invention provides a gravity gradiometer for use on a moving platform including a first proof mass having a first centers of mass and a second proof mass having a second centers of mass; capacitance means including a multiplicity of capacitance members at least one capacitance member provided by each of the proof masses; and means for placing the proof masses in free flight under the influence of the gravitational field with the centers of mass at different distances from the source of the gravitational field in which the gradient is to be measured and wherein the capacitance members of respective proof masses are adapted to be operatively spaced apart during free flight such that movement of the centers of mass with respect to each other during free flight due to the gravitational gradient causes a change in capacitance of the capacitance means to provide a measure of the movement of the centers of mass relative to each other.

The capacitance members may be vertically spaced apart such that the change in relationship during flight is a change in the spacing of the capacitance members. Alternatively the spacing of capacitance members may be horizontal so that change in separation of the centers of mass provides a change in the surface areas of respective capacitance members which are opposed.

The capacitance members will preferably provide one or more capacitance cells each including at least two capacitance members of fixed spacing provided by one proof mass and at least one capacitance member which is displaced with relative movement of the proof masses. The surface of the displaceable capacitance member typically includes a first portion operatively opposed to the one of the at least two capacitance members and a second portion opposed to the other of said at least two capacitance members to thereby provide at least two capacitors. When the capacitance members are vertically spaced apart the displaceable capacitance member may be a central or outer capacitance member. The capacitance members are preferably in the form of plates. The at least two of capacitance members of fixed spacing may be parallel plates including an upper plate and a lower plate. The third capacitance member may be a central plate parallel to each of the other capacitance members so that two capacitors are formed, one between the upper surface of the central plate and the opposed upper plate and the other between the lower surface of the central plate and the opposed lower plate. In some circumstances, however, it may be more convenient to use a third displaceable capacitance member disposed outside rather than between the two fixed capacitance members.

In another embodiment the displaceable capacitance member is horizontally spaced from a pair of aligned fixed plates so as to define two areas on its surface; one area opposed to each of the fixed plates. In this embodiment it is the area of the surface of the displaceable capacitance member opposed to respective fixed plates which changes on displacement of the proof masses with respect to each other.

In a preferred embodiment the gradiometer is provided with at least six capacitance members, at least three capacitance members provided by each proof mass. In this way at least two capacitance cells of the above type can be provided each cell including two capacitance members of fixed spacing provided by one proof mass and a third member movable with respect to the two capacitance members provided by the other proof mass. The third capacitance member may be located between two capacitance members of fixed spacing with the capacitance members vertically spaced.

The use of a plurality of capacitance cells enables common mode error signals from relative rotation or horizontal displacement to be reduced. Effects of relative rotations may also be partially removed by use of spherical plates with centers of curvature determined by the distance of separation of the two centers of mass. Of course, where a number of cells are used it may become particularly important to shield the cells from one another or from spurious fields.

The gravity gradiometer of the invention will generally be provided with a vacuum chamber within which the proof masses are launched and capacitance measurements are made. At least one of the first and second proof masses is generally provided with an energy storage means such as a battery for applying a voltage in carrying out capacitance measurements. The energy storage means may be remotely chargeable from outside the vacuum chamber and include means for transmitting a capacitance measurement signal to a remote receiver outside the vacuum chamber.

The means for placing the proof masses on free flight may simply release the proof masses while stationary to allow free fall or may propel the proof masses for example by launching them upward with respect to the mobile platform.

In one embodiment of the invention the proof masses are vertically aligned and simultaneously released to place them in free flight. Alternatively the objects may be placed in free flight by some other mechanism. For example the objects may be present in a reciprocating platform mounted on an axis the measurements being carried out by controlled motions of the launch platform in such a way that the objects are repeatedly placed into free flight.

The gravity gradiometer will generally provide free flight of the objects in a vacuum. This provides isolation from the spurious acceleration effects due to motion relative to a moving platform. It is preferred that the gradiometer is provided with an inertial platform whose accelerations are monitored in real time on six independent axes and the gravity gradiometer may be provided with information storage means and processing means to facilitate post processing of measurements.

Preferably the gradiometer is provided with means for recording the altitude and position of a vehicle in real time to facilitate post processing of the measurements to reduce anomalies.

The gradiometer may be provided with an absolute displacement sensor to provide a direct determination of the gravitational field for example by monitoring the fall of one of the proof masses using absolute interferometric determination of acceleration.

It will be understood that it is important to launch the proof masses into free fall in a carefully controlled way so that the launching procedure does not influence the fall or influences their fall in a predetermined way so that provision for the influence can be made in determining the result. In the preferred embodiment, the rotations of the objects are monitored directly during free fall using laser interferometry to permit removal of rotational effects during post processing.

Preferably the first and second objects are launched and retrieved as a combined object from an acceleration controlled moving platform. In this preferred embodiment the first and second proof masses are separated shortly after launch without the separation causing acceleration of the centers of mass. The positions of the centers of masses at launch may be controlled to provide a predetermined sensitivity to gravitational gradient.

In one embodiment of the invention one of the first and second proof masses is a reference proof mass and a measurement signal is passed from the other of the proof masses to the reference proof mass by suitable means such as electrical, optical, digital or analogue. It is preferred that the displacement signal is transferred from the gravity gradiometer to storage means which may be outside of the gradiometer and the storage means may provide adjustment of the measurement results to take into account the positional and altitude information gathered simultaneously.

A further embodiment of the instrument includes provision of a means to rotate the two failing objects at speed about a vertical axis before launch to provide gyroscopic stabilisation of the objects against rotations during free fall.

The gradiometer is preferably adapted to provide independent measurements at a frequency of at least one every two seconds (preferably about one every second). This may be achieved by using a series of independent proof masses launched in series and/or by providing rapid launch and measurement.

In a further embodiment the invention provides a gravity gradiometer as described above comprising means for independently repeating measurement of the rate of separation of the proof masses on the moving platforms and means for correlating the variations in independent measurements with positional change of the moving platform.

The invention will now be described with reference to the attached drawing in which.

Figure 1:
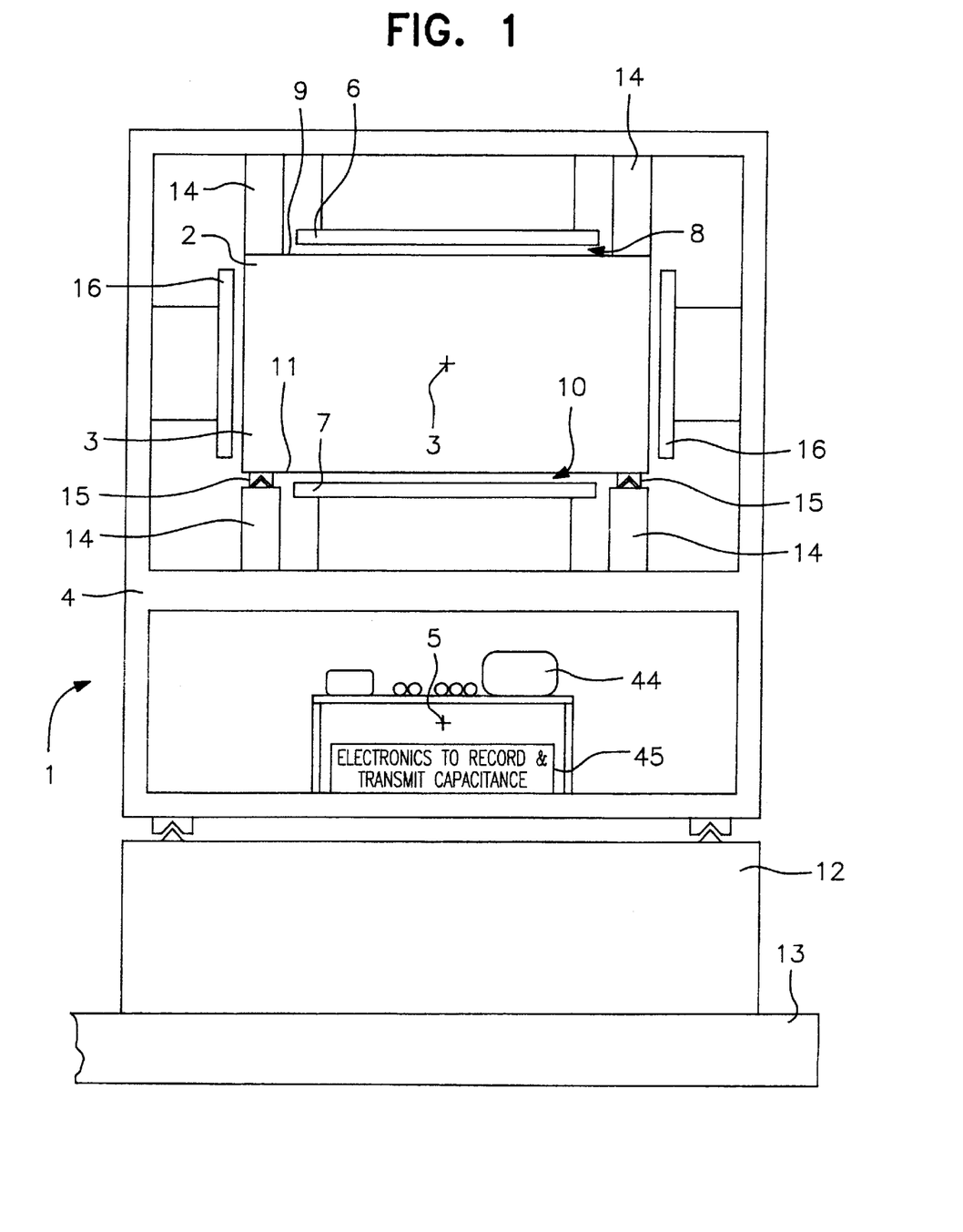
FIG. 1 is a schematic drawing of a gravity gradiometer showing one example of the relationship between first and second proof masses.

Referring to FIG. 1, there is shown a gravity gradiometer (1) including a first proof mass (2) having a centers of gravity (3) and a second proof mass (4) having centers of gravity (5) spaced vertically from the centers of gravity (3) of the first proof mass (2) and including capacitance members (6,7) in the form of vertically spaced horizontal plates (6,7).

A capacitance micrometry cell is provided by two capacitance members (6,7) and the first proof mass (2), which provides the third capacitance member, disposed between the two capacitance members (6,7) of the second proof mass (4) to define an upper capacitance gap (8) between the upper capacitance plate (6) and a upper surface (9) the first proof mass (2) and a lower capacitance gap (10) between the lower surface (11) of the first proof mass (2) and the lower capacitance plate (7).

When at rest the gradiometer is supported on an isolation platform (12) and a carriage (13) which is movable vertically to facilitate vertical free fall of the second proof mass (4) and first proof mass (2).

Launch clamps (14) are provided to allow the first proof mass (2) and second proof mass (4) to be held together with fixed predetermined capacitance gaps (8,10) prior to launch and may be provided with retractable spacers (15) to allow fine adjustment of the capacitance gaps (8,10) prior to launch. Sensing plates (16) may be provided to measure lateral displacement or relative rotation of the proof masses. The sense plates (16) may measure relative lateral displacement or rotation of the first and second proof masses (2,4) by capacitance micrometry the sensing plates (16) being disposed laterally at either end of the first proof mass (2) and defining a second capacitance cell therewith.

Launch is provided by the carriage (13) accelerating downward below the proof masses (2,4) so that the second proof mass (4) and first proof mass (2) are placed in free fall. At or shortly after the time of launch clamps (14) and retractable spacers (15) are removed from the first proof mass so that the first proof mass (2) is free falling independently of the second proof mass. A difference in acceleration of the proof masses (2,4) occurs due to the diminishing effect of the gravitational force with distance causing a separation of the centers of mass of the proof masses and a corresponding change in the capacitance gaps (8,10).

The second proof mass (4) includes a battery (44) for applying a voltage across capacitance gaps (8,10) and also electronics (45) for recording capacitance measurements and transmitting the results of measurements to a remote receiver for further processing.

Variations in the earths gravitational field are determined by comparison of the capacitance measurements made at different locations on or above the surface of the earth. Different capacitance measurements may be made during different stages in the free fall or by repetition of free fall measurements.

The second proof mass 4 includes a battery (44) and electronic component (45).

Figure 2:
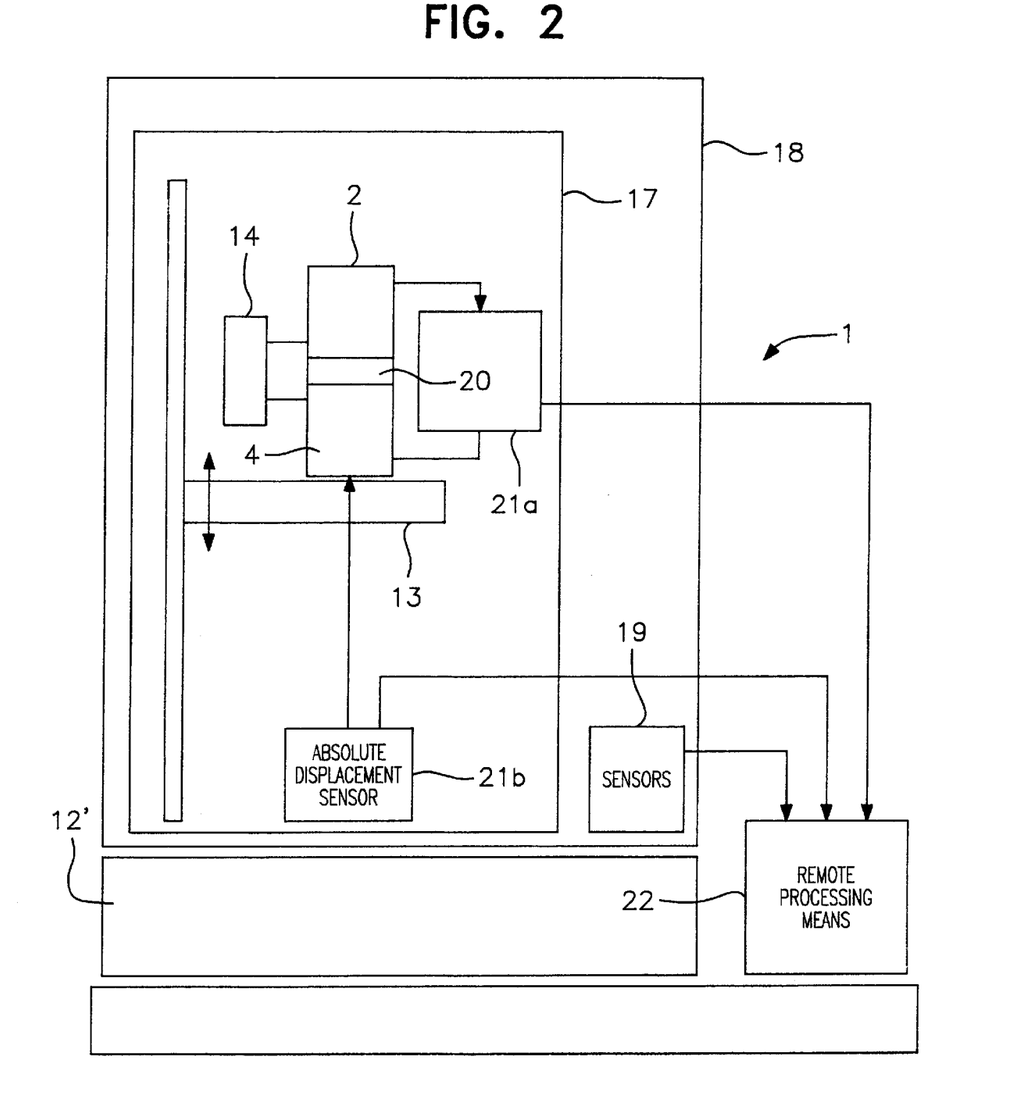
FIG. 2 is a schematic drawing of a gravity gradiometer mounted on a aircraft.

Referring to FIG. 2 the gravity gradiometer (1) is generally mounted within a vacuum chamber (17) and provided with a shield (18) isolating it from the thermal, electrostatic and magnetic environment within and immediately surrounding the vehicle.

The gradiometer is retained on a servoed isolated platform (12') provided with linear, rotational and acceleration sensors (19). The gradiometer (1) includes a servoed accelerated carriage (13) which is adapted to accelerate downward to launch proof masses (2,4) which are separated by a retractable spacer (20) and retained as a combined object prior to launch by a launching clamp (14). The launching clamp (14) is freed at the time of launch and the spacer (20) is retracted as the servoed carriage (13) moves downward.

A differential displacement sensor (21a) receives capacitance measurement information during flight and transmits the measurements to a remote processing means (22). Absolute displacement of at least one of the proof masses is determined by absolute displacement sensor (21(b)) which, may use interferometric techniques and provides absolute measurement of the gravitational field.

In accordance with FIG. 1 each of the masses is provided with a plate capacitor (not shown).

Figure 3:
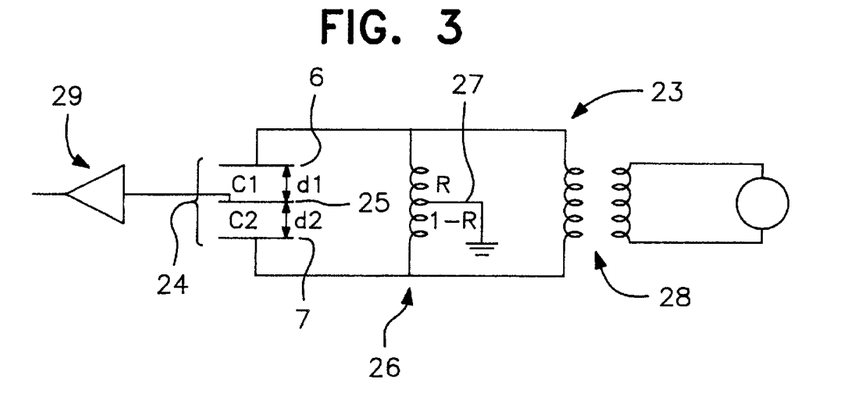
FIG. 3 is a block diagram of a capacitance micrometry bridge circuit.

Referring to FIG. 3 there is shown a bridge circuit (23) which may be utilized in monitoring the change in separation of the first proof mass (2) and second proof mass (4) during free flight in the gravity gradiometer of FIG. 1. The bridge circuit (23) comprises a variable capacitor cell (24) having a center plate (25) provided by the a first proof mass (2) between upper (6) and lower (7) capacitance plates of a second proof mass (4). The center plate (25) moves relative to the other plates (6,7) in response to the difference in acceleration of he two proof masses (2,4). The variable capacitor (24) is arranged in parallel with a tapped ratio transformer (26). The variable capacitor (24) by virtue of the movable centers plate forms a series arrangement of two capacitors C: and $C_2$ of unknown capacitance which form respective elements of the bridge circuit (23). The other two elements of the bridge circuit are formed by windings of the ratio transformer (26) on either side of the variable tapping point (27) or by alternate techniques for precision voltage division.

An isolation transformer (28) is provided for the bridge system to minimize stray capacitance effects to earth in the capacitance system.

A high impedance amplifier (29) is provided and the out-of-balance voltage of the bridge is measured with a synchronous detector or by full waveform digitisation of the out of balance signal. The gravity gradient is obtained by computation of the observed relative displacement of the plate systems with time after removal of spurious effects due to rotations.

The bridge is preferably a self balancing bridge in accordance with the disclosure of Australian Patent 558111 or U.S. Pat. No. 4,384,496 the contents of which are herein incorporated by reference.

The tap points may be available at a $10^{-5}$ resolution across a full dynamic range and referring to FIG. 3, where $d_1+d_2$ (which define the gap between two plates) is constant it can be shown that $d_1=R(d_1+d_2)$ and for R measured to $10^{-8}$ and $d_1+d_2=0.2$ mm a sensitivity of $2\times10^{-12}$m is obtained. In an alternate embodiment, the relative positions of the capacitance systems may be set such that $d_1=d_2$ immediately after release.

The principles of capacitance micrometry have been described in relation to other applications such as the load cell describe in Australian Patent Application 69743181, the contents of which are herein incorporated by reference.

FIG. 4 to FIG. 6a show alternative arrangements of capacitance members for reducing common mode error signals from relative rotation or horizontal displacement of free falling masses.

Figure 4:
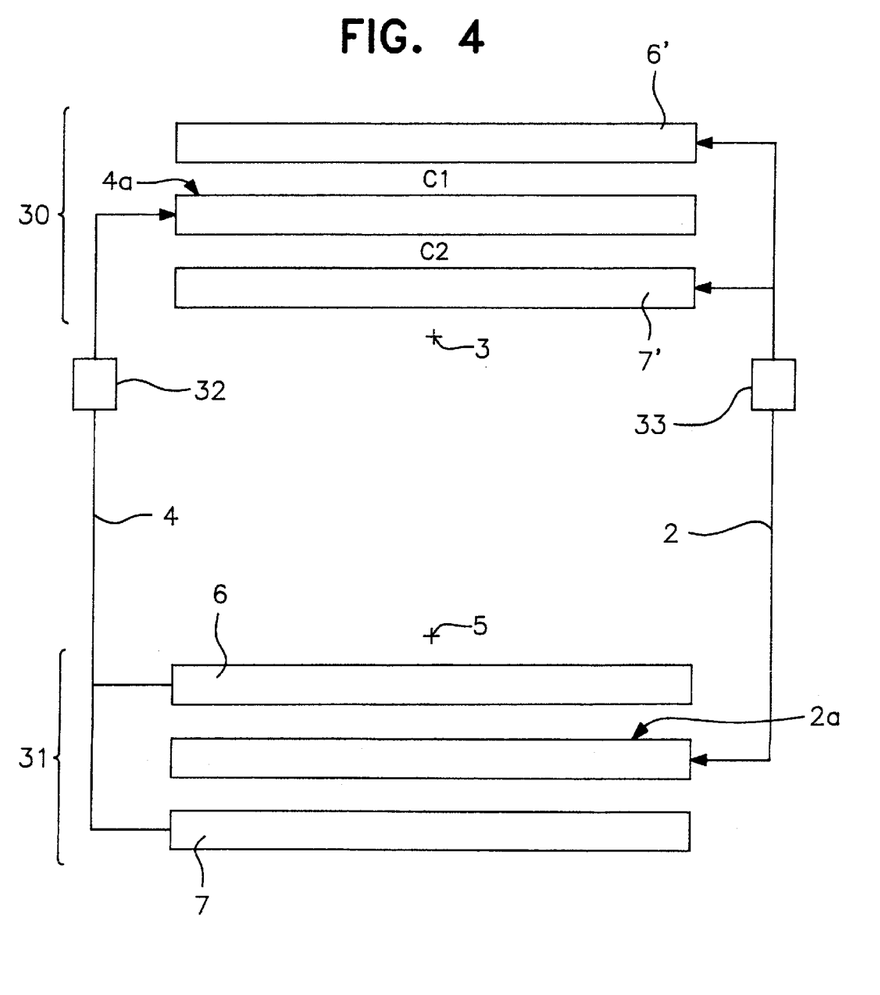
FIG. 4 is a schematic drawing showing the arrangement of capacitance member of proof masses in one embodiment of the invention.

In FIG. 4 two proof masses (2,4) each include three capacitance plates forming two variable capacitor cells (30,31) in which a first variable capacitor cell is provided by two fixed vertically spaced plates (6',7') of a first mass (2) with a central variable plate (4a) of the second mass (4). The second cell (31) mirrors the first variable capacitance cell (30) and includes two fixed vertically spaced plates (6,7) of the second mass (4) and a central variable plate (2a) of the first mass (2). Each capacitance cell forms two capacitors ($C_1,C_2$). During free fall difference in acceleration of the masses arising from the difference of the gravitation effect on respective centers of mass (3,5) causes a change in the separation of the capacitance plates. This system provides similar signals from each of the two capacitance cells as a result of centers rotation about a horizontal axis through the centers of mass but opposite signals due to gravity gradients. In this embodiment the distances between the plates (30,31) and their relative orientations can be controlled at and after launch by electrical or mechanical means (32,33)

Figure 5:
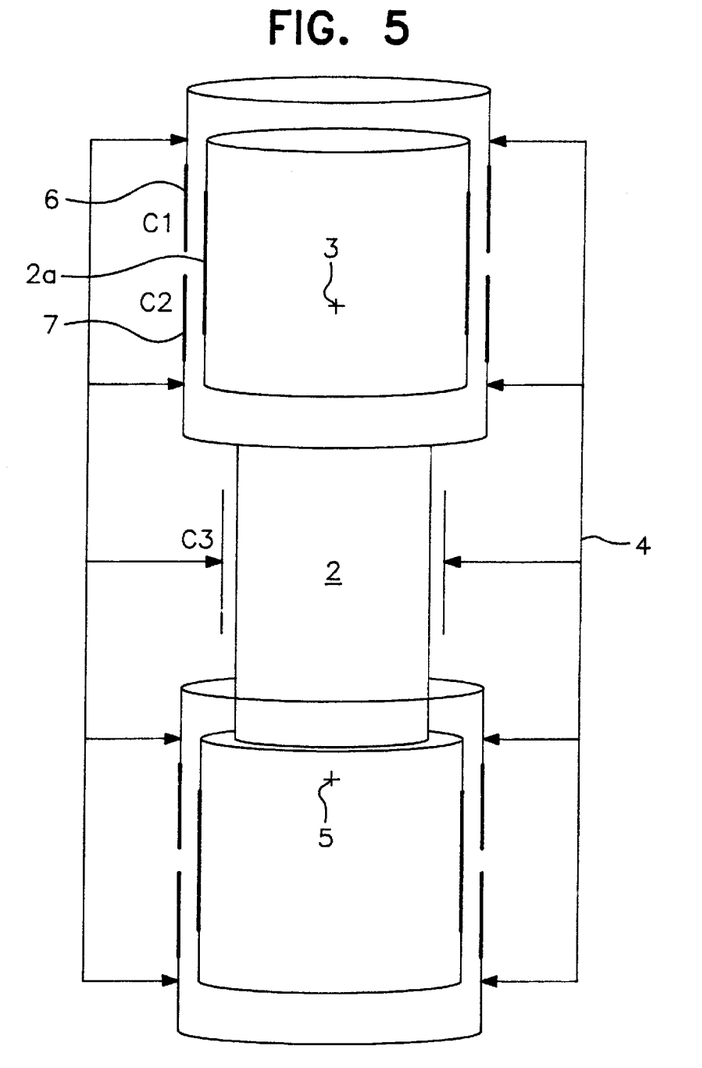
FIG. 5 is a schematic drawing showing a side view of an arrangement of capacitance members of proof masses in another embodiment of the invention.
Figure 5A:
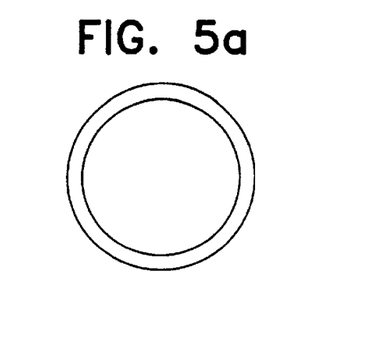
FIG. 5a is a cross section through the parts V–V of the arrangement of capacitance members shown in FIG. 5.

FIG. 5 and FIG. 5a show a capacitance plate system in which the proof masses (2, 4) provide two coaxial cylindrical elements in which the axis of the cylinders is vertical with vertically separated centers of mass (3, 5). Capacitance micrometry is used to measure relative displacement of the masses, using relative change in capacitance area of capacitors ($C_1,C_2$) rather than in capacitance gap. In contrast to the variable capacitor described with respect to FIG. 3 the variable capacitors include two aligned capacitance members of the second proof mass (6,7) and a single capacitance plate (2a) of the first proof mass being parallel to and spaced from the pair of capacitance member (6,7) of the second proof mass. As the spacing between the centers of mass of respective proof masses changes in response to the gravity gradient there is a corresponding change in the proportion of the area of the capacitance plate (2a) of the first proof mass facing each of the plates (6,7) of the second proof mass area of capacitors $C_1,C_2$. As in the case of other examples (FIG. 4), the capacitance plates may be segmented (FIG. 5a) to provide means of monitoring spurious relative rotations, and additional plate systems may be utilised to provide monitoring for unwanted translational motions.

Figure 6:
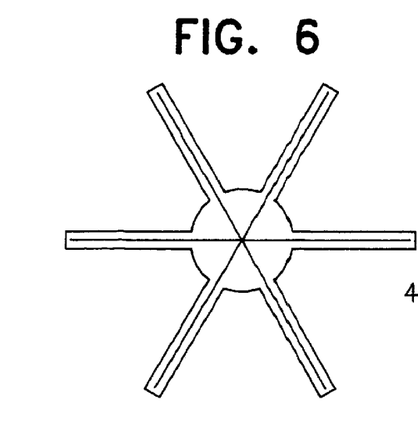
FIG. 6 is a schematic drawing showing a plan view of an arrangement of capacitance members of proof masses in a further embodiment of the invention.
Figure 6A:
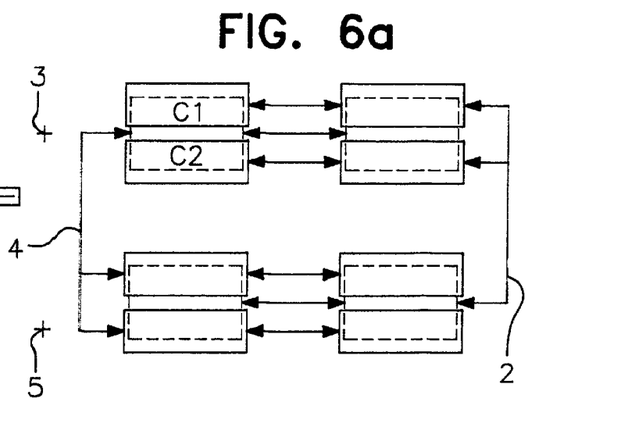
FIG. 6a is a side elevation of the arrangement of proof masses shown in FIG. 6.

FIGS. 6 and 6a show a further embodiment of the invention, based on proof masses (2, 4) in which capacitor members are in the form of coaxial cylinders having vertically separated centers of masses (3, 5), which improves signal size and allows detailed detection of rotation and horizontal translation effects by combining capacitance systems arranged in vertical planes, as shown.

The vertical planes of capacitance systems provide the capability to measure gravity gradients by area change in a three plate capacitance system, and separate effects from rotation about a horizontal axis, rotation about a vertical axis, and horizontal translation, by combining vertically separated and horizontally separated capacitance systems measuring change of capacitor gap.

Figure 7:
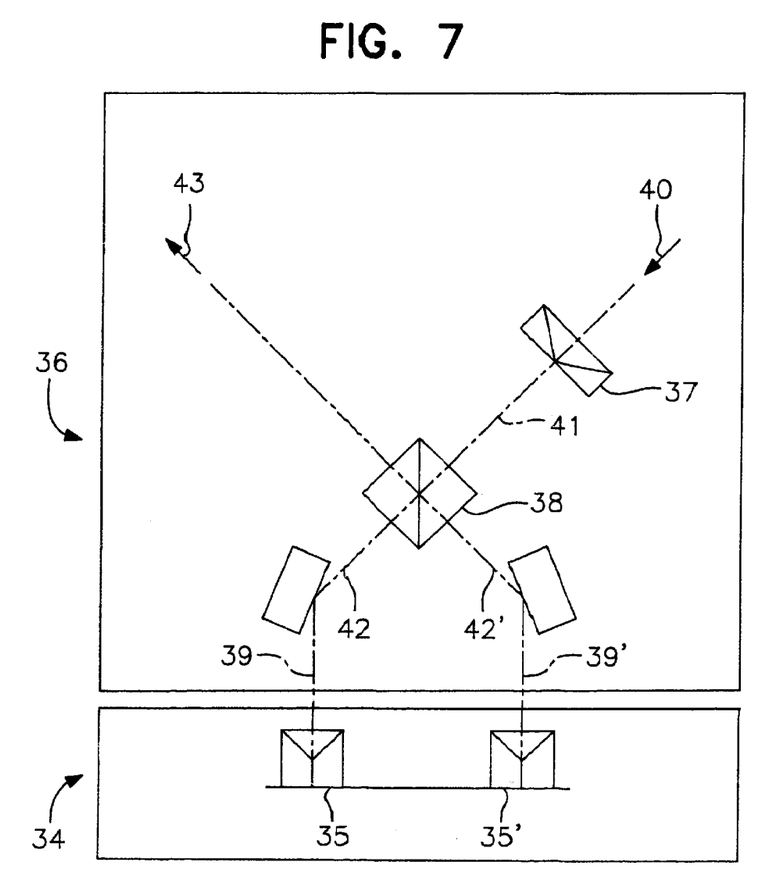
FIG. 7 shows an elevation view of an interferometric system suitable for monitoring the rotations of the falling objects.

FIG. 7 shows an interferometer which may be used for monitoring relations of a proof mass (34). The interferometer operates in two perpendicular planes one of which has been removed for clarity. In each of the planes retroreflectors (35, 35') such as corner cubes are spaced apart on the proof mass (34). The optical components (36) including laser beam spreader (37), beam splitter (38) and mirrors (39, 39') are independent of the proof mass (34) and may for example be stationary with respect to the platform (see (12) in FIG. 1).

In each of the perpendicular planes (one of which is shown in FIG. 7) the laser beam (40) is input via the beam spreader (37) to a beam splitter (38) which splits the filtered beam (41) into two paths (42, 42'). These paths (42, 42') travel via mirrors (39, 39') to the retroreflectors (35, 35') on the proof mass (34) from which light is returned to the beam splitter (38), recombined and presented to a photodetector (43) for analysis of the signal.

To carry out aerial prospecting the gravity gradiometer of the invention may be carried on a vehicle or aircraft and stabilized against motions of the vehicle or aircraft. The aircraft travels a predetermined flight path across the terrain and variations in the gradient of the vertical component of the earths gravity field detected by the instrument are correlated with the position of the aircraft for example by plotting the changes on a map. The post processing may also incorporate corrections for variation in altitude and attitude of the aircraft as well as the air pressure, temperature and the topography of the terrain.

The gravity gradiometer of the invention enables an high level of accuracy to be attained and the presence of mineral and oil deposits to be determined with great accuracy.

Modifications of any of these systems such as separating the centers of masses horizontally, can be used to measure the horizontal gradient of the horizontal component of gravity.

The present invention utilises capacitance micrometry to determine changes in gravitational field with great precision and has been found to obviate the problems inherent with gravity gradiometers which rely on measurements of acceleration made relative to a stabilized platform or measurements of position relative to a stabilized platform or using laser measurement devices.

Finally, it is to be understood that various other modifications and/or alterations may be made without departing from the spirit of the present invention as outlined herein.

I claim:

1. A gravity gradiometer comprising first and second proof masses and means for providing simultaneous free flight of the proof masses under the influence of the gravitational force in which the gradient is to be measured and capacitance means for monitoring the movement of the centers of mass with respect to each other during free flight by monitoring capacitance between portions of the two proof masses.

2. A gravity gradiometer for use on a moving platform including a first proof mass having a first centers of mass and a second proof mass having a second centers of mass; capacitance means including a multiplicity of capacitance members at least one capacitance member provided by each of the proof masses; and means for placing the proof masses in free flight under the influence of the gravitational field with the centers of mass at different distances from the source of the gravitational field in which the gradient is to be measured and wherein the capacitance members of respective proof masses are adapted to be operatively spaced apart during free flight such that movement of the centers of mass with respect to each other during free flight due to the gravitational gradient causes a change in capacitance of the capacitance means to provide a measure of the movement of the centers of mass relative to each other.

3. A gravity gradiometer according to claim 2 wherein the capacitance members are vertically spaced apart such that the change in operative relationship is a change in spacing of the respective capacitance members of respective proof masses.

4. A gravity gradiometer according to claim 2 wherein the capacitance members of respective proof masses are opposed and horizontally spaced such that the change in operative relationship during free flight is a change in the surface areas of respective capacitance members which are opposed.

5. A gravity gradiometer according to claim 2 wherein the capacitance members form one or more capacitance cells comprising at least two capacitance members of fixed spacing provided by one of the proof masses and at least one capacitance member displaceable with respect to said at least two capacitance members and provided by the other of the proof masses.

6. A gravity gradiometer according to claim 5 wherein said capacitance members are vertically spaced and the displaceable capacitance member is disposed between the capacitance members of fixed spacing.

7. A gravity gradiometer according to claim 2 comprising at least six capacitance members including least three capacitance members provided by each proof mass and forming at least two capacitance cells each cell including two capacitance members of fixed spacing provided by one proof mass and a third capacitance member movable with respect to the at least two capacitance members in response to relative movement of the first and second centers of mass.

8. A gravity gradiometer according to claim 2 wherein the first and second centers of mass are vertically aligned and spaced apart.

9. A gravity gradiometer according to claim 5 wherein the gradiometer includes a bridge circuit for combining the signals of the capacitors to at least partially remove common mode error from relative rotation of proof masses.

10. A gravity gradiometer according to claim 7 wherein the capacitance members are in the form of curved plates with the relative position of the centers of curvature determined by the separation of the first and second centers of mass.

11. A gravity gradiometer according to claim 2 provided with a vacuum chamber within which the proof masses are launched and capacitance measurements are made.

12. A gravity gradiometer according to claim 2 wherein at least one of the first and second proof masses includes an energy storage means for applying a voltage in carrying out capacitance measurements.

13. A gravity gradiometer according to claim 11 wherein at least one of the first and second proof masses includes an energy storage means for applying a voltage in carrying out capacitance measurements and the energy storage mean includes means for transmitting a capacitance measurement signal from at least one of the proof masses to a remote receiver.

14. A gravity gradiometer according to claim 2 comprising means for direct determining of the gravitational field on at least one of the proof masses by monitoring the flight of one of the proof masses using absolute interferometric determination of acceleration.

15. A gravity gradiometer according to claim 2 comprising means for monitoring the rotations of the proof masses directly during free flight of the proof masses using laser interferometry for removal of rotational effects from gradiometer measurements.

16. A gravity gradiometer according to claim 2 wherein the means for placing the proof masses in free flight operates to place the proof masses in free fall.

17. A gravity gradiometer according to claim 2 wherein the means for placing the proof masses comprises a launch platform mounted on an axis wherein the proof masses are repeatedly launched into free flight by reciprocating motion of the launch platform on the axis.

18. A gravity gradiometer according to claim 1 comprising means for launching the first and second proof masses as a combined object and providing separation shortly after launch without the separation causing acceleration of the centers of mass.

19. A gravity gradiometer according to claim 2 provided with an inertial platform and means for monitoring accelerations of the inertial platform in six independent axis.

20. A gravity gradiometer according to claim 2 comprising means for post processing of capacitance measurements to remove errors resulting from relative rotation of the proof masses and change in attitude or acceleration of the gradiometer.

21. A gravity gradiometer according to claim 2 comprising means for monitoring change in rate of separation of the proof masses to provide a measure of the change in gravity gradient with the movement of the moving platform.

22. A gravity gradiometer according to claim 21 comprising means for independently repeating measurement of the rate of separation of the proof masses on the moving platforms and means for correlating the variations in independent measurements with positional change of the moving platform.

23. A gravity gradiometer according to claim 22 comprising means for storage of positional information with respect to the surface of the earth and means for mapping the variation of gravity gradient with respect to positional change across the surface of the earth.

24. A method of aerial prospecting comprising transporting over selected terrain a gravity gradiometer according to claim 1, placing the proof masses in free flight with their centers of mass vertically spaced apart; monitoring the variations in capacitance across a gap between apposed portions of respective proof masses during free flight of the proof masses to provide a monitor of the rate of change in spacing of the centers of mass of the proof masses; and correlating changes in said rate of change with positional changes relative to the terrain.

* * * * *